(12) United States Patent
Kim et al.

(10) Patent No.: US 11,923,144 B2
(45) Date of Patent: Mar. 5, 2024

(54) MULTILAYER CERAMIC ELECTRONIC COMPONENT

(71) Applicant: SAMSUNG ELECTRO-MECHANICS CO., LTD., Suwon-si (KR)

(72) Inventors: Hyun Kim, Suwon-si (KR); Dong Jun Jung, Suwon-si (KR); Dae Hee Lee, Suwon-si (KR); Soo Jeong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 112 days.

(21) Appl. No.: 17/714,719

(22) Filed: Apr. 6, 2022

(65) Prior Publication Data

US 2023/0215631 A1 Jul. 6, 2023

(30) Foreign Application Priority Data

Dec. 31, 2021 (KR) .......................... 10-2021-0194290

(51) Int. Cl.
*H01G 4/012* (2006.01)
*H01G 4/008* (2006.01)
*H01G 4/232* (2006.01)
*H01G 4/30* (2006.01)

(52) U.S. Cl.
CPC ........... *H01G 4/012* (2013.01); *H01G 4/0085* (2013.01); *H01G 4/2325* (2013.01); *H01G 4/30* (2013.01)

(58) Field of Classification Search
CPC ...... H01G 4/0085; H01G 4/232; H01G 4/248; H01G 4/30; H01G 4/012; H01G 4/1227; H01G 4/2325; H01G 4/1209; H01G 4/228; H01G 4/306
See application file for complete search history.

(56) References Cited

U.S. PATENT DOCUMENTS

| 9,892,854 | B2 | 2/2018 | Nishisaka et al. | |
| 11,211,202 | B2* | 12/2021 | Woo | H01G 4/30 |
| 2001/0055193 | A1* | 12/2001 | Chazono | H01G 4/1209 361/311 |
| 2006/0208575 | A1* | 9/2006 | Orimo | H01G 4/30 307/109 |
| 2016/0071647 | A1* | 3/2016 | Nishisaka | H01G 4/0085 361/301.4 |

(Continued)

FOREIGN PATENT DOCUMENTS

| JP | 2016-171310 A | 9/2016 |
| JP | 2019-201106 A | 11/2019 |

(Continued)

*Primary Examiner* — Michael P McFadden
(74) *Attorney, Agent, or Firm* — Morgan, Lewis & Bockius LLP

(57) ABSTRACT

A multilayer ceramic electronic component includes: a body including dielectric layers as well as a plurality of internal electrodes stacked with respective dielectric layers interposed therebetween and including a first metal; and external electrodes disposed on external surfaces of the body including a second metal, wherein at least some of the plurality of internal electrodes include a core-shell region including the first and second metals, and average contents of the second metal in a core portion and a shell portion of the core-shell region are different from each other.

22 Claims, 6 Drawing Sheets

(56) References Cited

U.S. PATENT DOCUMENTS

| | | |
|---|---|---|
| 2016/0268046 A1 | 9/2016 | Nishisaka et al. |
| 2018/0130601 A1* | 5/2018 | Kim .................. C04B 35/62805 |
| 2018/0144863 A1* | 5/2018 | Kim ...................... H01G 4/248 |
| 2019/0355518 A1 | 11/2019 | Harada |
| 2020/0058444 A1* | 2/2020 | Cha ......................... H01G 4/12 |
| 2020/0090865 A1* | 3/2020 | Kim ......................... H01G 4/12 |
| 2020/0126727 A1* | 4/2020 | Woo .................... H01G 4/1227 |
| 2020/0335280 A1 | 10/2020 | Tanaka et al. |

FOREIGN PATENT DOCUMENTS

| | | |
|---|---|---|
| JP | 2020-178114 A | 10/2020 |
| JP | 2021-015925 A | 2/2021 |
| KR | 10-2016-0110123 A | 9/2016 |

* cited by examiner

MULTILAYER CERAMIC ELECTRONIC COMPONENT

CROSS-REFERENCE TO RELATED APPLICATION(S)

This application claims benefit of priority to Korean Patent Application No. 10-2021-0194290 filed on Dec. 31, 2021 in the Korean Intellectual Property Office, the disclosure of which is incorporated herein by reference in its entirety.

TECHNICAL FIELD

The present disclosure relates to a multilayer ceramic electronic component.

BACKGROUND

A multilayer ceramic capacitor (MLCC), one type of multilayer ceramic electronic component, is a chip-type condenser mounted on a printed circuit board of several electronic products such as an image display device, for example, a liquid crystal display (LCD) or a plasma display panel (PDP), a computer, a smartphone, and a mobile phone to serve to charge or discharge electricity therein or therefrom.

The multilayer ceramic capacitor may be used as components of various electronic apparatuses since it has a small size, implements high capacitance, and may be easily mounted. In accordance with electronization of functions of many electronic products in fields requiring high reliability and an increase in demand for these electronic products, the multilayer ceramic capacitor has been required to have high reliability. Factors that are problematic in the high reliability of the multilayer capacitor include penetration of a plating solution occurring in a plating process, occurrence of cracking due to external impacts, penetration of external moisture, and the like.

In order to solve such problems, in the related art, a multilayer ceramic capacitor preventing penetration of moisture and a plating solution by forming nickel (Ni)-copper (Cu) alloy regions at end portions of internal electrodes connected to external electrodes to improve coupling force between the internal electrodes and the external electrodes has been developed.

However, when the nickel (Ni)-copper (Cu) alloy regions are excessively formed, there may still be a problem that a radial crack may occur due to volumetric expansion of the internal electrodes, a decrease in flexural strength due to cracking and permeation of moisture through the crack may then occur. Accordingly, there is a need to develop a multilayer ceramic capacitor having improved moisture resistance reliability while preventing excessive volumetric expansion of the internal electrodes.

RELATED ART DOCUMENT

Patent Document (Patent Document 1) Korean Patent Laid-Open Publication No. 10-2016-0110123

SUMMARY

An aspect of the present disclosure may provide a multilayer ceramic electronic component having improved moisture resistance reliability and high-temperature insulation resistance (IR) characteristics.

An aspect of present disclosure may also provide a multilayer ceramic electronic component capable of preventing penetration of external moisture and a plating solution by improving a coupling force between internal electrodes and external electrodes.

An aspect of present disclosure may also provide a multilayer ceramic electronic component capable of preventing occurrence of cracking due to excessive formation of an alloy in internal electrodes.

However, an aspect of the present disclosure is not limited thereto, and may be more easily understood in a process of describing exemplary embodiments in the present disclosure.

According to an aspect of the present disclosure, a multilayer ceramic electronic component may include: a body including dielectric layers as well as a plurality of internal electrodes stacked with respective dielectric layers interposed therebetween and including a first metal; and external electrodes disposed on external surfaces of the body including a second metal, wherein at least some of the plurality of internal electrodes include a core-shell region including the first and second metals, and average contents of the second metals in a core portion and a shell portion of the core-shell region are different from each other.

According to an aspect of the present disclosure, a multilayer ceramic electronic component may include: a body including dielectric layers as well as a plurality of internal electrodes stacked with respective dielectric layers interposed therebetween and including a first metal; and external electrodes disposed on external surfaces of the body including a second metal, wherein at least one of the plurality of internal electrodes includes a core-shell region including the second metal, the core-shell region includes a shell portion having a first region and a second region, the first region is nearer to a central portion of the shell portion than the second region, and a content of the second metal in the first region is higher than a content of the second metal in the second region.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
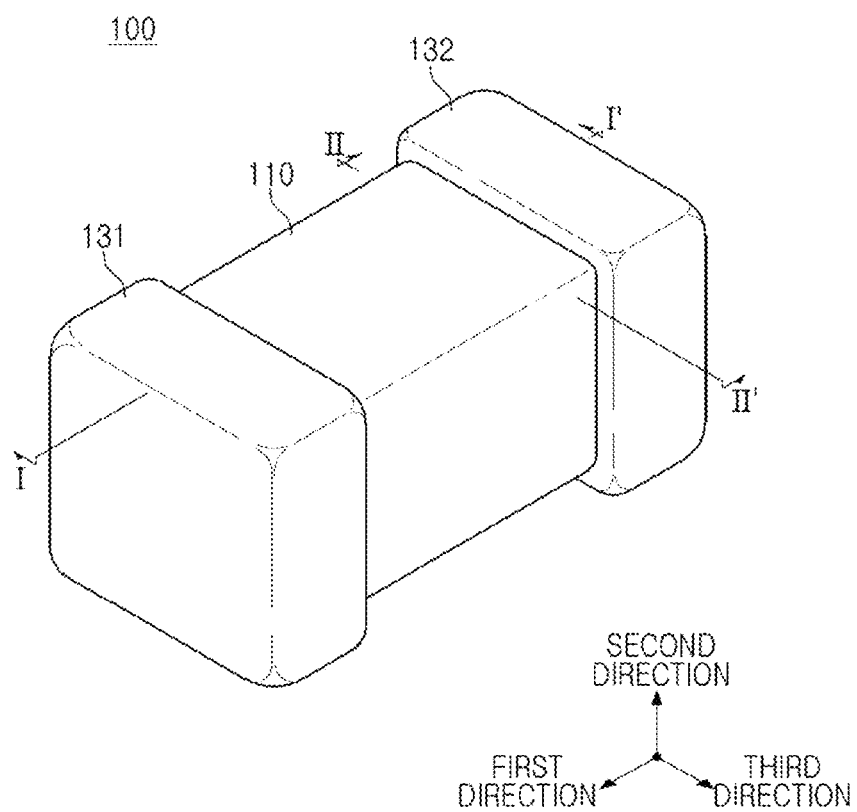
FIG. 1 is a schematic perspective view illustrating a multilayer ceramic electronic component according to an exemplary embodiment in the present disclosure.

Hereinafter, exemplary embodiments of the present disclosure will be described in detail with reference to the accompanying drawings.

In the drawings, a first direction may refer to a length L direction, a second direction may refer to a thickness T direction, and a third direction may refer to a width W direction.

FIG. 1 is a schematic perspective view illustrating a multilayer ceramic electronic component according to an exemplary embodiment in the present disclosure.

Figure 2:
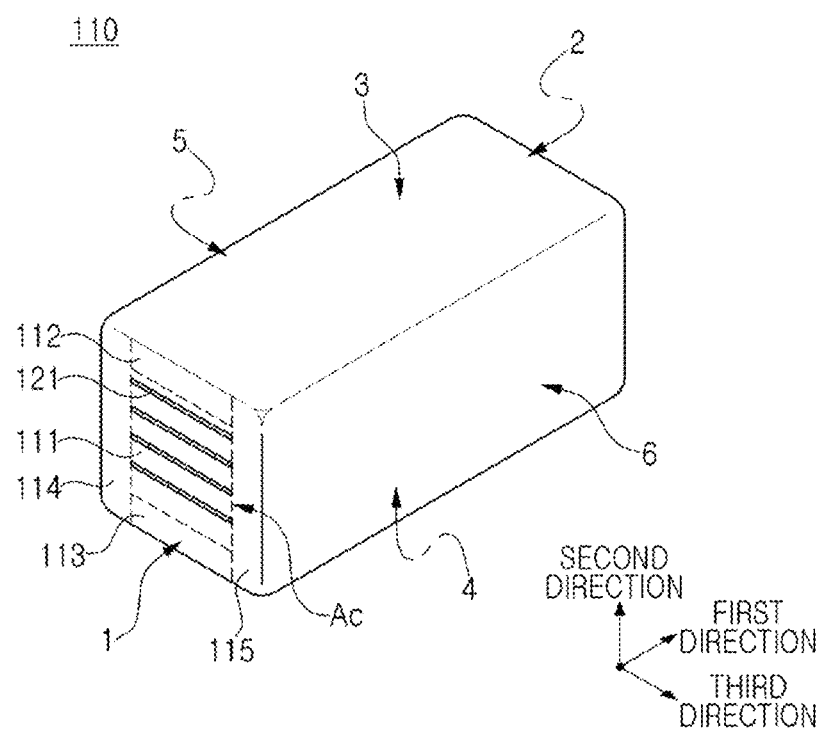
FIG. 2 is a schematic perspective view illustrating a body of the multilayer ceramic electronic component.

FIG. 2 is a schematic perspective view illustrating a body of the multilayer ceramic electronic component.

Figure 3:
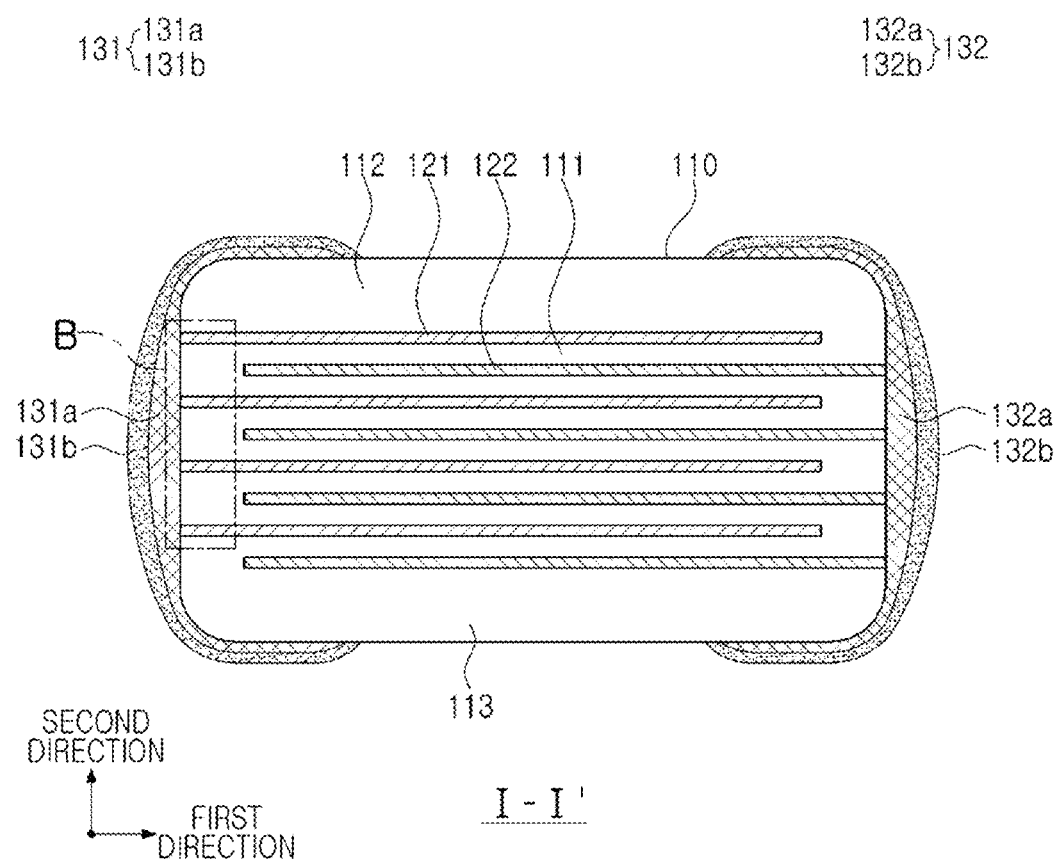
FIG. 3 is a schematic cross-sectional view taken along line I-I' of FIG. 1.

FIG. 3 is a schematic cross-sectional view taken along line I-I' of FIG. 1.

Figure 4:
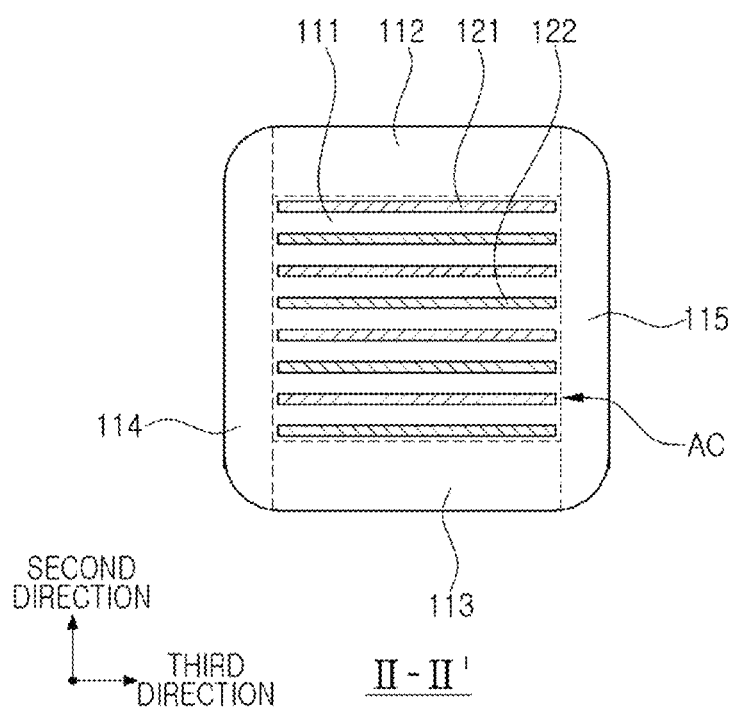
FIG. 4 is a schematic cross-sectional view taken along line II-II' of FIG. 1.

FIG. 4 is a schematic cross-sectional view taken along line II-II' of FIG. 1.

Figure 5:
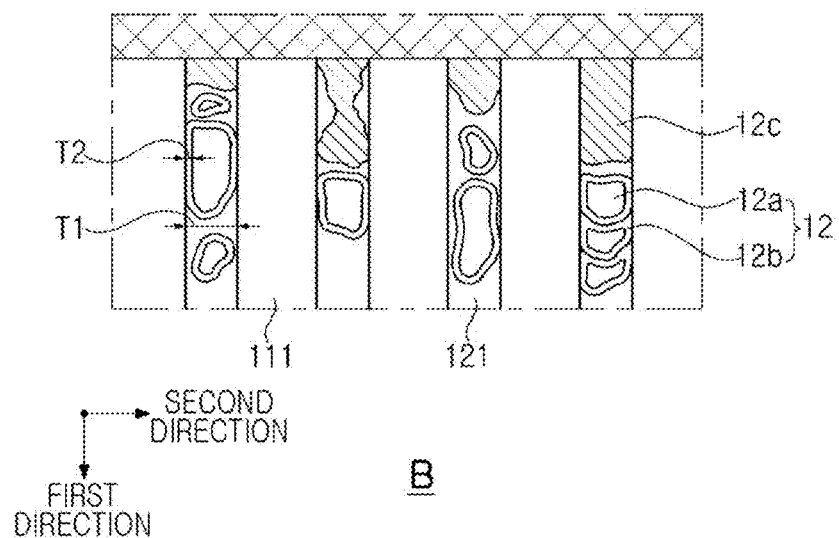
FIG. 5 is an enlarged view of region B of FIG. 3.

FIG. 5 is an enlarged view of region B of FIG. 3.

Figure 6:
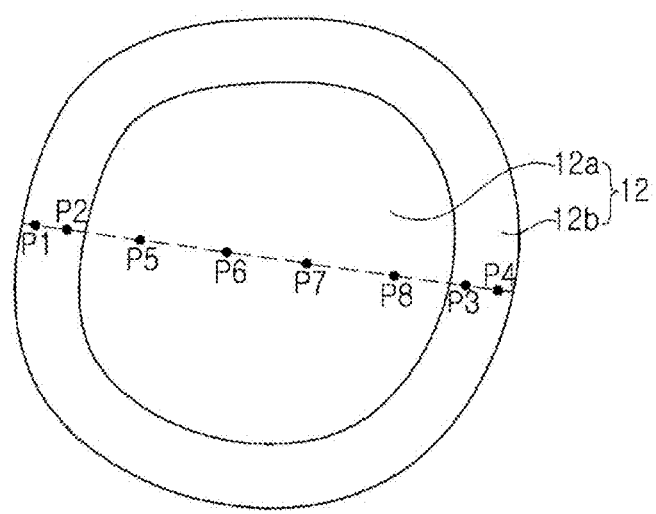
FIG. 6 is a schematic view illustrating a core-shell region of an internal electrode.

FIG. 6 is a schematic view illustrating a core-shell region of an internal electrode.

Referring to FIGS. 1 through 6, a multilayer ceramic electronic component 100 according to an exemplary embodiment in the present disclosure may include a body 110 including dielectric layers 111 and including a plurality of internal electrodes 121 and 122 stacked with each of the dielectric layers 111 interposed therebetween and including a first metal, and external electrodes 131 and 132 disposed on external surfaces of the body 110 and including a second metal, wherein at least some of the plurality of internal electrodes 121 and 122 include a core-shell region 12 including the first and second metals, and average contents of the second metals in a core portion 12a and a shell portion 12b of the core-shell region 12 are different from each other.

As described above, when the alloy regions are formed at end portions of the internal electrodes connected to the external electrodes in order to improve moisture resistance reliability of the multilayer ceramic electronic component, the radial crack may occur due to the volumetric expansion of the internal electrodes, and external moisture may be permeated through the crack.

On the other hand, in the multilayer ceramic electronic component 100 according to the exemplary embodiment in the present disclosure, at least some of the plurality of internal electrodes 121 and 122 may include the core-shell region 12 including the first and second metals to improve moisture resistance reliability of the multilayer ceramic electronic component 100 and prevent the radial crack occurring due to volumetric expansion of the internal electrodes 121 and 122.

Respective components included in the multilayer ceramic electronic component 100 according to an exemplary embodiment in the present disclosure will hereinafter be described in more detail.

A shape of the body 110 is not particularly limited, and may be a hexahedral shape or a shape similar to the hexahedral shape, as illustrated in the drawings. Although the body 110 does not have a hexahedral shape with perfectly straight lines due to shrinkage of ceramic powder particles included in the body 110 in a sintering process or polishing of edge portions, the body 110 may have substantially the hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing each other in the third direction.

The body 110 may include the dielectric layers 111 and the internal electrodes 121 and 122 alternately stacked therein. A plurality of dielectric layers 111 forming the body 110 may be in a sintered state, and adjacent dielectric layers 111 may be integrated with each other so that boundaries therebetween are not readily apparent without using a scanning electron microscope (SEM).

The dielectric layer 111 may be formed by sintering a ceramic green sheet including ceramic powder particles, an organic solvent, and a binder. The ceramic powder is not particularly limited as long as it may obtain sufficient capacitance, and may be, for example, a barium titanate ($BaTiO_3$)-based material a strontium titanate ($SrTiO_3$)-based material, or the like, but the present disclosure is not limited thereto.

In this case, a thickness of the dielectric layer 111 may be 10 μm or less in consideration of a size and capacitance of the body 110, and may be 0.6 μm or less and more preferably 0.4 μm or less for miniaturization and a capacitance increase of the multilayer ceramic electronic component 100, but the present disclosure is not limited thereto.

Here, the thickness of the dielectric layers 111 refers to an average thickness of the dielectric layer 111 disposed between the internal electrodes 121 and 122. The average thickness of the dielectric layer 111 may be measured by scanning a cross section of the body 110 in the first and second directions with a scanning electron microscope having a magnification of 10,000. More specifically, an average value may be measured by measuring thicknesses of one dielectric layer 111 at a plurality of points of the one dielectric layer 111, for example, at 30 points disposed at equal intervals in the first direction. In addition, when average values of the plurality of dielectric layers 111 are measured, an average thickness of the dielectric layer 111 may further be generalized.

The body 110 may include a capacitance forming portion Ac disposed in the body 110 and forming capacitance by including a plurality of first internal electrodes 121 and a plurality of second internal electrodes 122 disposed to face each other with each of the dielectric layers 111 interposed therebetween, a first cover portion 112 formed on an upper surface of the capacitance forming portion Ac, and a second cover portion 113 disposed on a lower surface of the capacitance forming portion Ac.

The first and second cover portions 112 and 113 may be formed by stacking a single dielectric layer or two or more dielectric layers on the upper and lower surfaces of the capacitance forming portion Ac, respectively, and may basically serve to prevent damage to the internal electrodes due to physical or chemical stress. The first and second cover portions 112 and 113 may have the same configuration as the dielectric layer 111 except that they do not include the internal electrodes. An average thickness of each of the first and second cover portions 112 and 113 may be 20 μm or less, but the present disclosure is not limited thereto. The thickness of each of the first and second cover portions 112 and 113 may refer to a length of each of the first and second cover portions 112 and 113 in the second direction, and may refer to an average value of thicknesses measured at 30 points disposed at equal intervals in the first direction in the cross section of the body 110 in the first and second directions.

The body 110 may include margin portions 114 and 115 disposed on side surfaces of the capacitance forming portion Ac in the third direction. The margin portions 114 and 115 may include a first margin portion 114 disposed on the fifth surface 5 of the body 110 and a second margin portion 115 disposed on the sixth surface 6. The margin portions 114 and 115 may refer to regions between both ends of the internal electrodes 121 and 122 and interfaces of the body 110 in a cross section of the body 110 cut in the second and third directions. The margin portions 114 and 115 may basically serve to prevent damage to the internal electrodes 121 and 122 due to physical or chemical stress. The margin portions 114 and 115 may include the same or different material from the dielectric layer 111.

The margin portions 114 and 115 may be formed by applying a conductive paste onto ceramic green sheets except for places where the margin portions are to be formed to form the internal electrodes. Alternatively, in order to suppress a step due to the internal electrodes 121 and 122, the margin portions 114 and 115 may be formed by stacking ceramic green sheets to form a laminate, cutting the laminate so that the internal electrodes 121 and 122 are exposed to the fifth and sixth surfaces 5 and 6 of the body, respectively, and then stacking a single dielectric layer or two or more dielectric layers on opposite side surfaces of the capacitance forming portion Ac in the third direction. An average thickness of each of the margin portions 114 and 115 may be 20 μm or less, but the present disclosure is not limited thereto. The thickness of each of the margin portions 114 and 115 may refer to a length of each of the margin portions 114 and 115 in the third direction, and may refer to an average value of thicknesses measured at 30 points disposed at equal intervals in the second direction in the cross section of the body 110 in the second and third directions.

The internal electrodes 121 and 122 and the dielectric layers 111 may be alternately disposed, and the plurality of first internal electrodes 121 and the plurality of second internal electrodes 122 may be disposed to face each other with each of the dielectric layer 111 interposed therebetween. That is, the first and second internal electrodes 121 and 122, which are a pair of electrodes having different polarities, may be formed to be alternately exposed, respectively, through the first and second surfaces 1 and 2 of the body 110 along the stacked direction of the dielectric layers 111. For example, each of the plurality of first internal electrodes 121 may be spaced apart from the second surface 2 and be exposed through the first surface 1. In addition, each of the plurality of second internal electrodes 122 may be spaced apart from the first surface 1 and be exposed through the second surface 2. The plurality of first internal electrodes 121 and the plurality of second internal electrodes 122 may be electrically separated from each other by each of the dielectric layers 111 disposed therebetween. The plurality of first internal electrodes 121 and the plurality of second internal electrodes 122 may be alternately stacked in the second direction, but are not limited thereto, and may also be alternately stacked in the third direction.

Each of the internal electrodes 121 and 122 may be formed by printing a conductive paste for an internal electrode including a first metal at a predetermined thickness on ceramic green sheet. A method of printing the conductive paste for an internal electrode may be a screen printing method, a gravure printing method, or the like, but the present disclosure is not limited thereto.

The first metal included in each of the internal electrodes 121 and 122 may be one or more of nickel (Ni), copper (Cu), palladium (Pd), silver (Ag), gold (Au), platinum (Pt), tin (Sn), tungsten (W), titanium (Ti), and alloys thereof, and more preferably include nickel (Ni).

In this case, a thickness of each of the internal electrodes 121 and 122 may be 10 μm or less in consideration of a size and capacitance of the body 110, and may be 0.8 μm or less and more preferably 0.4 μm or less for miniaturization and a capacitance increase of the multilayer ceramic electronic component 100, but the present disclosure is not limited thereto.

Here, the thickness of each of the internal electrodes 121 and 122 may refer to an average thickness of each of the internal electrodes 121 and 122. The average thickness of each of the internal electrodes 121 and 122 may be measured by scanning the cross section of the body 110 in the first and second directions with a scanning electron microscope having a magnification of 10,000. More specifically, an average value may be measured by measuring thicknesses of one internal electrode at a plurality of points of the one internal electrode, for example, at 30 points disposed at equal intervals in the first direction. When an average thickness of a plurality of internal electrodes is measured, the average thickness of the internal electrode may be further generalized.

The external electrodes 131 and 132 may be disposed on the first and second surfaces 1 and 2 of the body 110, respectively, and may partially extend to the third, fourth, fifth, and sixth surfaces 3, 4, 5, and 6. The external electrodes 131 and 132 may include a first external electrode 131 and a second external electrode 132 connected respectively to the plurality of first internal electrodes 121 and the plurality of second internal electrodes 122.

The external electrodes 131 and 132 may include the second metal, and the second metal included in the external electrodes 131 and 132 may one or more of copper (Cu), nickel (Ni), palladium (Pd), platinum (Pt), gold (Au), silver (Ag), lead (Pb), and alloys thereof, and more preferably include copper (Cu).

The external electrodes 131 and 132 may be formed by dipping the first and second surfaces 1 and 2 of the body 110 in a conductive paste for an external electrode including second metal powder particles and a glass and then firing the conductive paste. Alternatively, the external electrodes 131 and 132 may be formed in a manner of transferring a sheet including a conductive metal and a glass. Accordingly, the external electrodes 131 and 132 may be fired electrodes including the conductive metal and the glass.

A structure in which the multilayer ceramic electronic component 100 includes two external electrodes 131 and 132 has been described with reference to the drawings, but the present disclosure is not limited thereto, and the number, shapes, or the like, of external electrodes 131 and 132 may be changed depending on shapes of the internal electrodes 121 and 122 or other purposes.

An enlarged view of partial regions of the first internal electrode 121 and the first external electrode 131 has been illustrated in FIG. 5, and a description will hereinafter be provided in relation to the first internal electrode 121 and the first external electrode 131. However, this description may be considered as including a description of the second internal electrode 122 and the second external electrode 132 because configurations of the second internal electrode 122 and the second external electrode 132 may be similar to those of the first internal electrode 121 and the first external electrode 131 except that the first external electrode 131 is connected to the first internal electrode 121 and the second external electrode 132 is connected to the second internal electrode 122.

At least some of the plurality of internal electrodes 121 may include the core-shell region 12 including the first and second metals. That is, the core-shell region 12 may include the core portion 12a and the shell portion 12b surrounding the core portion 12a.

The shell portion 12b may be defined as a region in which a content of the second metal is 2 at % or more, and the core portion 12a may be defined as a region surrounded by the shell portion 12b. In this case, a content of the second metal in the core portion 12a may be less than 2 at %. The content (at %) of the second metal may be measured by mapping the second metal in the cross section of the body 110 in the first and second directions through scanning transmission electron microscopy-energy dispersive X-ray spectroscopy (STEM-EDS) analysis and using a line profile of the core-shell region 12.

The average contents of the second metal in the core portion 12a and the shell portion 12b may be different from each other. The average content of the second metal in the shell portion 12b may be derived as an average value of data of four points P1 to P4 obtained by measuring contents (at %) of the second metal at the four points P1 to P4 in one core-shell region 12. In addition, the average content of the second metal in the core portion 12a may be derived as an average value of data of four points P5 to P8 obtained by measuring contents (at %) of the second metal at the four points P5 to P8 in one core-shell region 12. As described above, the content of the second metal may be measured in the cross section of the body 110 in the first and second directions through the scanning transmission electron microscopy-energy dispersive X-ray spectroscopy (STEM-EDS) analysis and the line profile.

In this case, the average content of the second metal may be higher in the shell portion 12b than in the core portion 12a. For example, when the first metal includes nickel (Ni) and the second metal includes copper (Cu), an average content of copper (Cu) may be higher in the shell portion 12b than in the core portion 12a. Since at least some of the plurality of internal electrodes 121 include the core-shell region 12, even though an excessive alloy region is not formed, moisture resistance reliability of the multilayer ceramic electronic component 100 may be improved, and a radial crack due to volumetric expansion of the internal electrode 121 may be prevented. That is, the moisture resistance reliability of the multilayer ceramic electronic component 100 may be improved by the shell portion 12b in which the content of the second metal is high, and the content of the second metal in the core portion 12a thicker than the shell portion 12b may be lower than that of the shell portion 12b, such that the occurrence of the crack due to the volumetric expansion of the internal electrode 121 may be prevented.

The core-shell region 12 may be formed by diffusion of the second metal toward the internal electrodes 121 and 122 in a process of applying and firing a conductive paste for an external electrode to the body 110. Accordingly, the core-shell region 12 may be formed in a region within 1 μm to 10 μm from an interface between the internal electrode 121 and the external electrode 131. The distance from the interface may be determined by, for example, observing the cross section of the body 110 in the first and second directions through the scanning transmission electron microscopy-energy dispersive X-ray spectroscopy (STEM-EDS) analysis. Since the core-shell region 12 is formed by the diffusion, at least some of the plurality of internal electrodes 121 may include a plurality of core-shell regions 12. In addition, due to the diffusion of the second metal, at least some of the plurality of internal electrodes 121 may include an alloy region 12c of the first and second metals. Accordingly, the moisture resistance reliability of the multilayer ceramic electronic component 100 may be further improved.

In this case, when a firing temperature of the external electrode 131 is excessively high, the alloy region 12c may be excessively formed. Accordingly, a volume of the internal electrode 121 may expand, such that a radial crack may occur in the body 110. In addition, when the firing temperature of the external electrode 131 is excessively low, the core-shell region 12 may not be formed. Accordingly, the firing temperature of the external electrode 131 may be set to 700 to 900° C., but the present disclosure is not limited thereto.

In addition, the core-shell region 12 may be easily formed by allowing a ratio (hereinafter, referred to as glass coverage) of a length in the second direction covered by the glass to a length of the interface between the external electrode 131 and the internal electrode 121, that is, a length of the first surface 1 of the body 110 in the second direction in a cross section of the multilayer ceramic electronic component 100 in the first and second directions to be 2% to 33%, but the present disclosure is not limited thereto.

When the glass coverage is 2% to 33%, in at least some of the internal electrodes 121, the second metal may not be diffused to a central portion of the internal electrode 121 in the thickness direction, and may be diffused through an interface between the internal electrode 121 and the dielectric layer 111, such that the core-shell region 12 may be formed.

When the ratio of the length covered by the glass is less than 2%, the alloy region 12c may be excessively formed. Accordingly, the radial crack may occur due to the volumetric expansion of the internal electrode 121. When the ratio of the length covered by the glass exceeds 33%, the glass may block the diffusion of the second metal, such that the core-shell region 12 may not be formed. Accordingly, moisture resistance and high temperature insulation resistance reliability may be deteriorated.

Here, the glass may have a composition in which oxide is mixed, and may include transition metal oxide such as zinc (Zn) oxide and/or alkaline earth metal oxide such as calcium (Ca) oxide, but the present disclosure is not limited thereto. In this case, a glass softening point may be 600 to 700° C. in order to adjust the glass coverage, and the glass may include one or more of $ZnO$, $BaO$, $B_2O_3$, $SiO_2$, $CaO$, $Al_2O_3$, $Li_2O$, $K_2O$, and $V_2O_5$ in order to adjust the glass softening temperature, but the present disclosure is not limited thereto.

A content of the glass included in the conductive paste for an external electrode may be 1 wt % to 20 wt % based on 100 wt % of the second metal powder particles, but the present disclosure is not limited thereto, and the content of the glass included in the conductive paste for an external electrode may vary depending on a composition and firing conditions of the conductive paste for an external electrode.

In an exemplary embodiment, the core-shell region 12 may have a gradient in the content of the second metal. For example, as the shell portion 12b becomes distant from the core portion 12a in the thickness direction of the internal electrode 121, the content of the second metal in the shell portion 12b may increase and then decrease. For example, relative to a content of the second metal in the core portion, a content of the second metal in the shell portion may increase and then decrease in a direction away from core portion and along a thickness direction of the internal electrodes. For example, a content of the second metal in a first region of the shell portion nearer to a central portion of the shell portion may be higher than a content of the second metal in the second region of the shell portion further away from the central portion. Accordingly, a point in the shell portion 12b at which the content of the second metal is a maximum value may be formed at a central portion of the shell portion 12b in the thickness direction. That is, the shell portion 12b may have a peak value of the content of the second metal.

In an exemplary embodiment in the present disclosure, a maximum value of the content of the second metal in the shell portion 12b may be 3 at % to 20 at %. In addition, in an exemplary embodiment, a minimum value of the content of the second metal in the core portion 12a may be 1 at % to 1.5 at %. Further, in an exemplary embodiment, in one core-shell region 12, a ratio of the maximum value of the content of the second metal of the shell portion 12b to the minimum value of the content of the second metal of the core portion 12a may be 3.0 to 14.2.

Accordingly, the moisture resistance reliability of the multilayer ceramic electronic component 100 may be improved due to the shell portion 12b in which the content of the second metal is high, and the occurrence of the crack may be prevented by significantly suppressing the volumetric expansion of the internal electrode 121 due to the core portion 12a in which the content of the second metal is low.

In an exemplary embodiment in the present disclosure, a ratio of a thickness T2 of the shell portion 12b to a thickness T1 of the internal electrode 121 may be 0.12 to 0.23. In this case, the thickness of the internal electrode 121 may be measured by analyzing the cross section of the body 110 in the first and second directions through STEM-EDS. The thickness of the shell portion 12b may refer to a length from a point at which the content of the second metal appearing as the shell portion 12b becomes distant from the center of the core portion 12a was 2 at % after measuring the gradient the content of the second metal through an EDS line profile of the core-shell region 12 to another point at which the content of the second metal appearing as the shell portion 12b becomes distant from the center of the core portion 12a again was 2 at %. In this case, the thickness T2 of the shell portion 12b may be, for example, 70 to 150 nm, but the present disclosure is not limited thereto.

In an exemplary embodiment in the present disclosure, the external electrodes 131 and 132 may be disposed on the body 110, and may include, respectively, first electrode layers 131a and 132a including the second metal and second electrode layers 131b and 132b each disposed on the first electrode layers 131a and 132a and including a third metal. In this case, the first electrode layers 131a and 132a may be fired electrodes including the second metal and the glass. The first electrode layers 131a and 132a may be formed by dipping the body 110 in a conductive paste for an external electrode including the second metal powder particles and the glass and then firing the conductive paste.

The second electrode layers 131b and 132b may improve mounting characteristics. A type of each of the second electrode layers 131b and 132b is not particularly limited, and each of the second electrode layers 131b and 132b may be a plating layer including nickel (Ni), tin (Sn), palladium (Pd), and/or alloys thereof as the third metal, and may be formed as a plurality of layers. Each of the second electrode layers 131b and 132b may be, for example, a nickel (Ni) plating layer or a tin (Sn) plating layer, and may have a form in which a nickel (Ni) plating layer and a tin (Sn) plating layer are sequentially formed. In addition, each of the second electrode layers 131b and 132b may include a plurality of nickel (Ni) plating layers and/or a plurality of tin (Sn) plating layers.

Example

A conductive paste for an internal electrode including nickel (Ni) powder particles as first metal powder particles was printed on a ceramic green sheet to form an internal electrode pattern, and ceramic green sheets on which the internal electrode patterns are formed were then stacked to prepare a ceramic laminate.

The ceramic sheet was sintered to form the body 110 including the dielectric layers 111 and the internal electrodes 121 and 122, the first and second surfaces 1 and 2 of the body 110 were dipped in a conductive paste for an external electrode including copper (Cu) powder particles as second metal powder particles and a glass, and the conductive paste was then fired to form the external electrodes 131 and 132.

Figure 7:
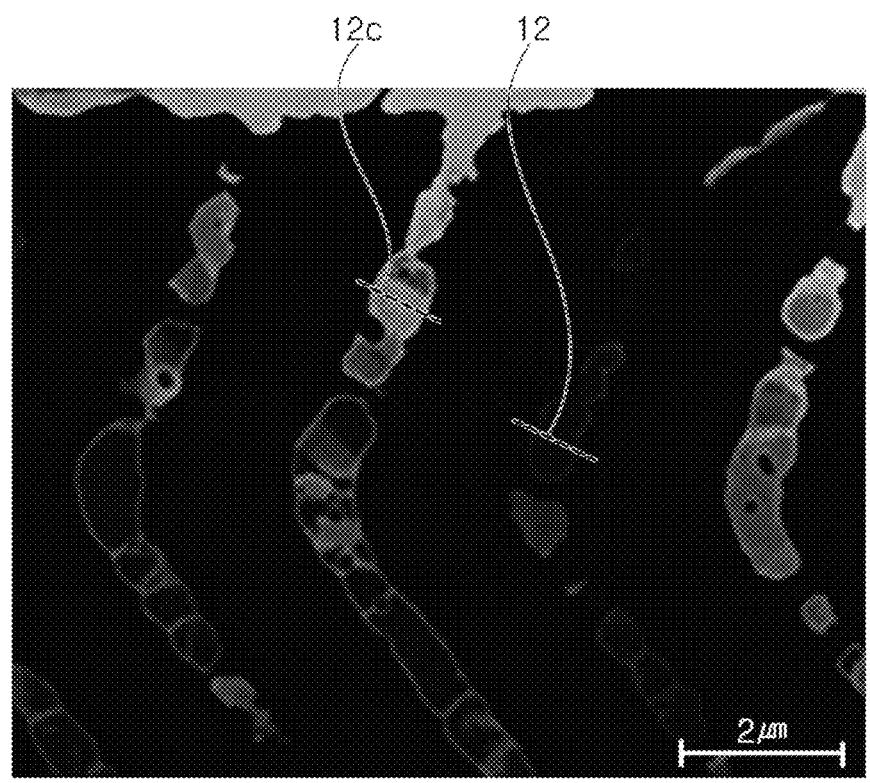
FIG. 7 is an image of an internal electrode in a region connected to an external electrode, analyzed through scanning transmission electron microscopy-energy dispersive X-ray spectroscopy (STEM-EDS)

FIG. 7 is an image of an internal electrode in a region connected to an external electrode, analyzed through scanning transmission electron microscopy-energy dispersive X-ray spectroscopy (STEM-EDS). More specifically, FIG. 7 is an image obtained by scanning each of the internal electrodes 121 and 122 in a region connected to each of the external electrodes 131 and 132 in the cross section of the body 110 in the first and second directions at a magnification of 9,900 and then mapping a copper (Cu) element. In this case, the brighter the region, the higher the content of copper (Cu) element.

Referring to FIG. 7, in the core-shell region 12, the shell portion that appears bright due to a high content of copper (Cu) and the core portion that appears dark due to a low content of copper (Cu) may be clearly distinguished from each other. In addition, the alloy region 12c may be distinguished from the core-shell region 12 through the diffusion of copper (Cu) to a central portion of each of the internal electrodes 121 and 122 in the thickness direction in the alloy region 12c.

Thereafter, in FIG. 7, a line-profile analysis of the core-shell region 12 was performed in a dotted line direction. In addition, in FIG. 7, a line-profile analysis of the alloy region 12c of the first and second metals was performed in the dotted line direction.

Figure 8:
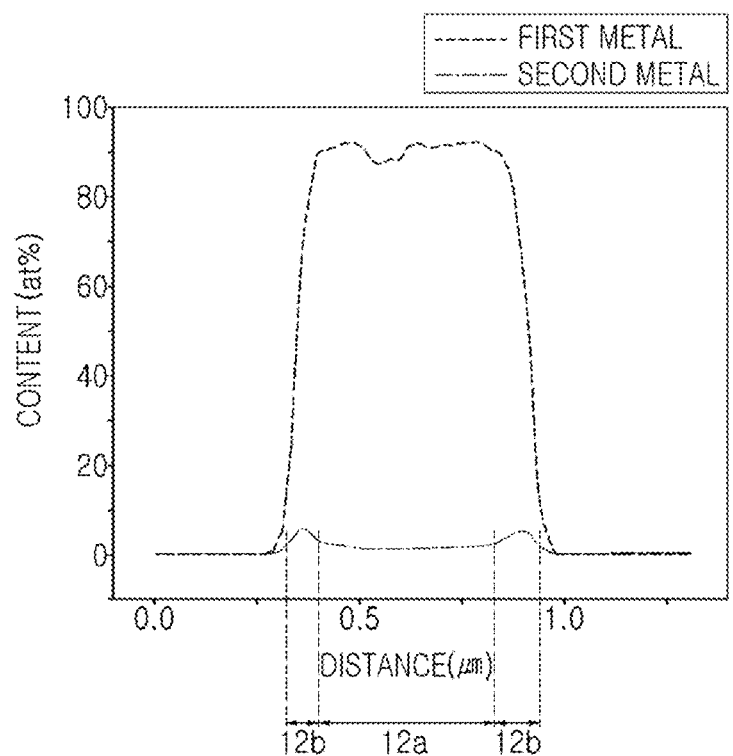
FIG. 8 is a graph illustrating an EDS line profile analysis result indicating an amount of detected copper (Cu) (second metal) obtained by analyzing a core-shell region of FIG. 7 in a dotted line direction.
Figure 9:
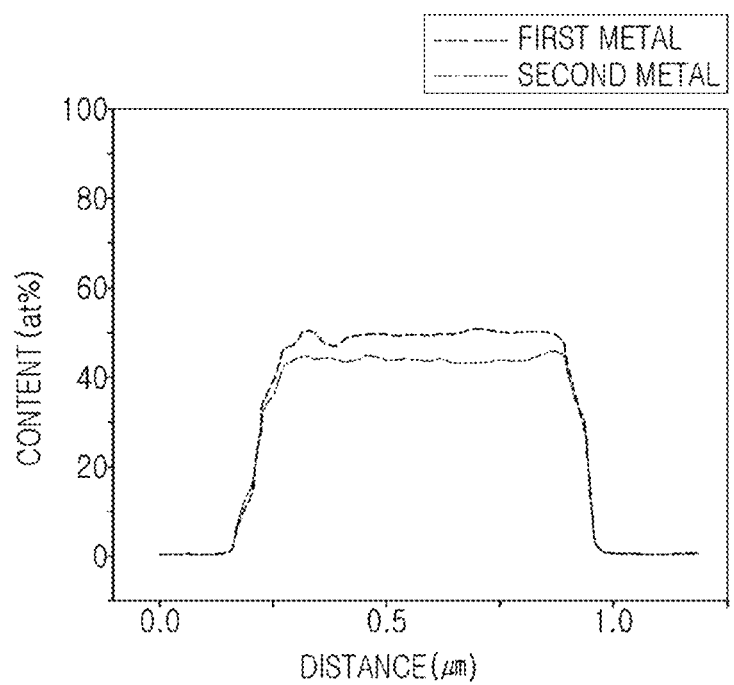
FIG. 9 is a graph illustrating an EDS line profile analysis result indicating an amount of detected copper (Cu) (second metal) obtained by analyzing an alloy region of FIG. 7 in a dotted line direction.

FIG. 8 is a graph illustrating an EDS line profile analysis result indicating an amount of detected copper (Cu) (second metal) obtained by analyzing a core-shell region of FIG. 7 in a dotted line direction. FIG. 9 is a graph illustrating an EDS line profile analysis result indicating an amount of detected copper (Cu) (second metal) obtained by analyzing an alloy region of FIG. 7 in a dotted line direction.

Referring to FIGS. 8 and 9, it can be seen that a peak of a content of copper (Cu) occurs in the shell portion 12b of the core-shell region 12. Therefore, it can be seen that the shell portion 12b that first comes into contact with moisture penetrating from the outside may improve moisture resistance reliability due to a high content of copper (Cu) and the core portion 12a having a great thickness may prevent the occurrence of a crack by significantly suppressing volumetric expansion of the internal electrode due to a low content of copper (Cu). Accordingly, the core-shell region 12 may prevent the occurrence of the crack due to the volumetric expansion of the internal electrode while improving the moisture resistance reliability together with the alloy region 12c.

In the core-shell region 12 disposed in a region in which a distance from an interface between the external electrode and the internal electrode is 1 to 10 μm through the EDS line profile analysis result, a ratio of the thickness T2 of the shell portion 12b to the thickness T1 of the internal electrode, a maximum value of the content of the second metal in the shell portion 12b, a minimum value of the content of the second metal in the core portion 12a, and a ratio of a maximum value of the content of the second metal of the shell portion 12b to a minimum value of the content of the second metal of the core portion 12a were measured and measurement results were shown in Table 1. In this case, average values of values measured in five samples for each Sample No. were shown.

TABLE 1

| Sample No. | 1 | 2 | 3 | 4 | 5 | 6 | 7 | 8 | 9 | 10 |
|---|---|---|---|---|---|---|---|---|---|---|
| Distance (μm) | 1 | 2 | 3 | 4 | 5 | 6 | 7 | 8 | 9 | 10 |
| Thickness (nm) of Shell portion | 110 | 105 | 125 | 100 | 150 | 130 | 100 | 100 | 80 | 70 |
| Thickness (nm) of Internal Electrode | 630 | 480 | 730 | 610 | 665 | 640 | 650 | 635 | 555 | 570 |
| Thickness Ratio | 0.17 | 0.22 | 0.17 | 0.16 | 0.23 | 0.20 | 0.15 | 0.16 | 0.14 | 0.12 |
| Cu max (at %) of Shell portion | 5 | 3.3 | 6.2 | 6.9 | 6.5 | 10.3 | 12.6 | 18.4 | 6.1 | 6.7 |
| Cu min (at %) of Core portion | 1.3 | 1.1 | 1.3 | 1.2 | 1 | 1.2 | 1.2 | 1.3 | 1.2 | 1.5 |
| Content Ratio | 3.8 | 3.0 | 4.8 | 5.8 | 6.5 | 8.6 | 10.5 | 14.2 | 5.1 | 4.5 |

Referring to Table 1, it can be seen that the thickness T2 of the shell portion 12b is 70 to 150 nm, and the ratio of the thickness T2 of the shell portion 12b to the internal electrode thickness T1 is 0.12 to 0.23. In addition, it can be seen that the maximum value of the content of copper (Cu) in the shell portion 12b is 3 to 20 at %, it can be seen that the minimum value of the content of copper (Cu) in the core portion 12a is 1 to 1.5 at %, and it can be seen that the ratio of the maximum value of the content of copper (Cu) in the shell portion 12b to the minimum value of the content of copper (Cu) in the core portion 12a is 3.0 to 14.2.

A moisture resistance reliability test was performed on Example including the internal electrode in which the core-shell region 12 is formed and Comparative Example including the internal electrode in which the core-shell region 12 and the alloy region 12c were not formed. Insulation resistance was measured for each of 40 sample chips while applying a rated voltage of 4V for 24 hours under conditions of a relative humidity of 85% and a temperature of 85° C.

Figure 10:
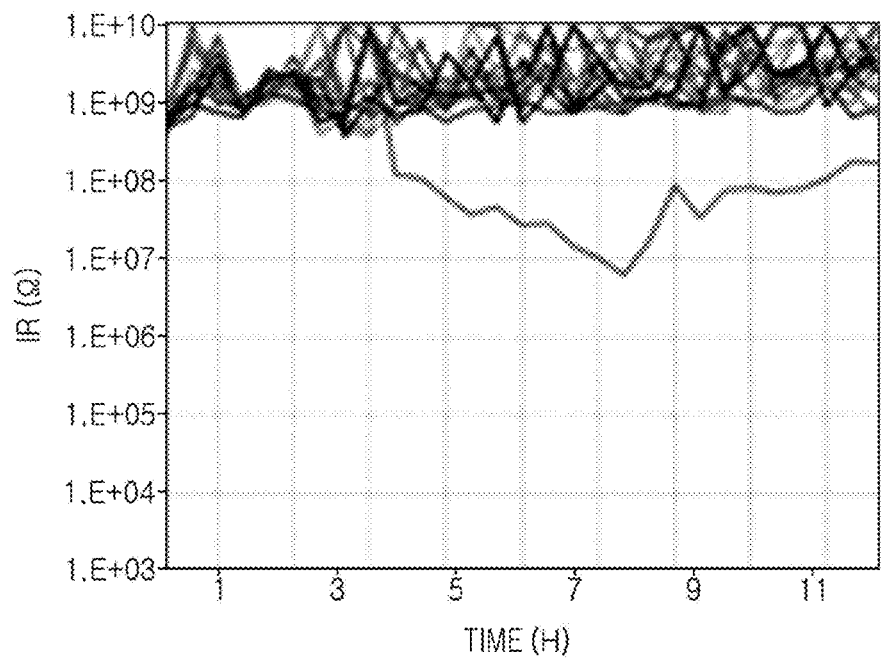
FIG. 10 is an overlay of graphs illustrating results of a moisture resistance reliability test according to the Example.
Figure 11:
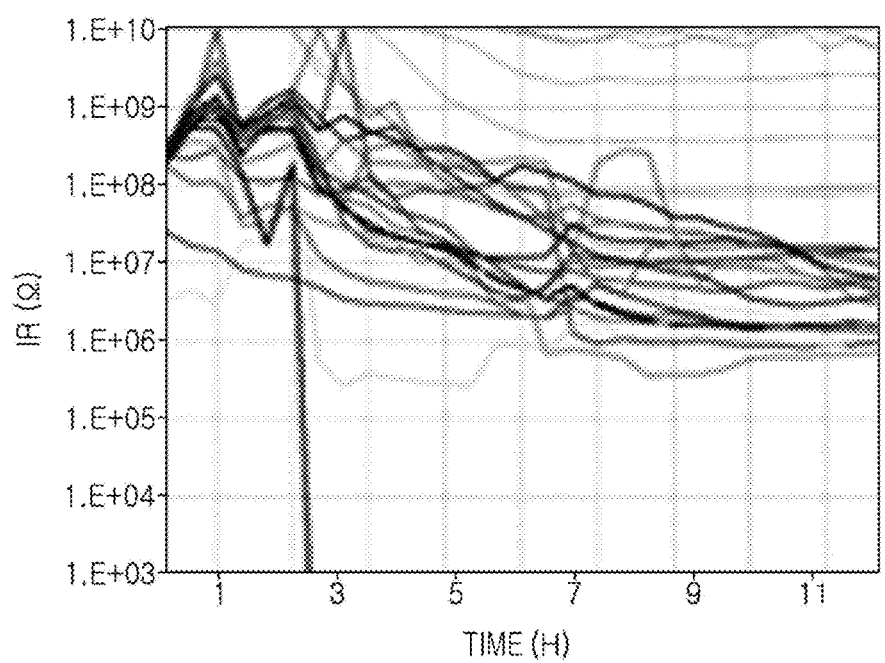
FIG. 11 is an overlay of graphs illustrating results of a moisture resistance reliability test according to Comparative Example.

FIG. 10 is an overlay of graphs illustrating results of a moisture resistance reliability test according to Example. FIG. 11 is an overlay of graphs illustrating results of a moisture resistance reliability test according to Comparative Example. Referring to FIGS. 10 and 11, it can be seen that in a case of Example including the internal electrode in which the core-shell region 12 is formed, insulation resistance of all samples except for one sample is maintained at $10^8 \Omega$ or more. On the other hand, it can be see that in a case of Comparative Example, insulation resistance of most samples is not maintained at $10^8 \Omega$ or more.

As set forth above, according to an exemplary embodiment in the present disclosure, moisture resistance reliability and high-temperature insulation resistance (IR) characteristics of the multilayer ceramic electronic component may be improved.

In addition, penetration of external moisture and a plating solution may be prevented by improving a coupling force between the internal electrodes and external the electrodes.

Further, the occurrence of the crack due to excessive formation of the alloy the internal electrodes may be prevented.

While exemplary embodiments have been shown and described above, it will be apparent to those skilled in the art that modifications and variations could be made without departing from the scope of the present disclosure as defined by the appended claims.

What is claimed is:

1. A multilayer ceramic electronic component comprising:
   a body including dielectric layers as well as a plurality of internal electrodes stacked with respective dielectric layers interposed therebetween and including a first metal; and
   external electrodes disposed on external surfaces of the body including a second metal,
   wherein at least some of the plurality of internal electrodes include a core-shell region including the first and second metals, and
   wherein a core portion and a shell portion of the core-shell region include the second metal such that average contents of the second metal in the core portion and the shell portion are different from each other.

2. The multilayer ceramic electronic component of claim 1, wherein the average content of the second metal is higher in the shell portion than in the core portion.

3. The multilayer ceramic electronic component of claim 1, wherein the core-shell region is disposed in a region within 1 μm to 10 μm from an interface between at least one of the internal electrodes and at least one of the external electrodes.

4. The multilayer ceramic electronic component of claim 1, wherein the core-shell region has a gradient in a content of the second metal.

5. The multilayer ceramic electronic component of claim 4, wherein, relative to a content of the second metal in the core portion, a content of the second metal in the shell portion increases and then decreases in a direction away from core portion and along a thickness direction of the internal electrodes.

6. The multilayer ceramic electronic component of claim 1, wherein at least some of the plurality of internal electrodes include a plurality of core-shell regions.

7. The multilayer ceramic electronic component of claim 1, wherein at least some of the plurality of internal electrodes include an alloy region of the first and second metals.

8. The multilayer ceramic electronic component of claim 1, wherein a ratio of a thickness of the shell portion to a thickness of at least one of the internal electrodes is 0.12 to 0.23.

9. The multilayer ceramic electronic component of claim 1, wherein a maximum value of a content of the second metal in the shell portion is 3 at % to 20 at %.

10. The multilayer ceramic electronic component of claim 1, wherein a minimum value of a content of the second metal in the core portion is 1 at % to 1.5 at %.

11. The multilayer ceramic electronic component of claim 1, wherein a ratio of a maximum value of a content of the second metal in the shell portion to a minimum value of a content of the second metal in the core portion is 3.0 to 14.2.

12. The multilayer ceramic electronic component of claim 1, wherein the first metal includes nickel (Ni), and the second metal includes copper (Cu).

13. The multilayer ceramic electronic component of claim 1, wherein the external electrodes are disposed on the body, and include, respectively, first electrode layers including the second metal and second electrode layers each disposed on the first electrode layers and including a third metal.

14. The multilayer ceramic electronic component of claim 13, wherein at least one of the second electrode layers has a multilayer structure including a first layer including nickel (Ni) as the third metal and a second layer including tin (Sn) as the third metal.

15. A multilayer ceramic electronic component comprising:
a body including dielectric layers as well as a plurality of internal electrodes stacked with respective dielectric layers interposed therebetween and including a first metal; and
external electrodes disposed on external surfaces of the body including a second metal,
wherein at least one of the plurality of internal electrodes includes a core-shell region including the second metal,
the core-shell region includes a shell portion having a first region and a second region,
the first region is nearer to a central portion of the shell portion than the second region, and
a content of the second metal in the first region is higher than a content of the second metal in the second region.

16. The multilayer ceramic electronic component of claim 15, wherein at least some of the plurality of internal electrodes include a plurality of core-shell regions.

17. The multilayer ceramic electronic component of claim 15, wherein the core-shell region further includes a core portion including the second metal.

18. The multilayer ceramic electronic component of claim 17, wherein average contents of the second metal in the core and shell portions are different from each other.

19. The multilayer ceramic electronic component of claim 18, wherein the average content of the second metal is higher in the shell portion than in the core portion.

20. The multilayer ceramic electronic component of claim 19, wherein the shell portion surrounds the core portion.

21. The multilayer ceramic electronic component of claim 15, wherein the first metal includes nickel (Ni).

22. The multilayer ceramic electronic component of claim 15, wherein the second metal includes copper (Cu).

* * * * *